United States Patent
Liu et al.

(10) Patent No.: US 10,609,639 B2
(45) Date of Patent: Mar. 31, 2020

(54) SIGNAL TRANSMISSION METHOD AND NETWORK DEVICE

(71) Applicant: Huawei Technologies Co., Ltd., Shenzhen (CN)

(72) Inventors: Kunpeng Liu, Beijing (CN); Yongxing Zhou, Beijing (CN); Leiming Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 15/804,182

(22) Filed: Nov. 6, 2017

(65) Prior Publication Data
US 2018/0063779 A1 Mar. 1, 2018

Related U.S. Application Data

(63) Continuation of application No. PCT/CN2015/078425, filed on May 7, 2015.

(51) Int. Cl.
| | |
|---|---|
| *H04W 48/20* | (2009.01) |
| *H04W 74/08* | (2009.01) |
| *H04W 16/28* | (2009.01) |
| *H04W 72/00* | (2009.01) |
| *H04W 48/10* | (2009.01) |
| *H04W 48/12* | (2009.01) |
| *H04L 5/00* | (2006.01) |
| *H04L 12/18* | (2006.01) |

(52) U.S. Cl.
CPC .......... *H04W 48/20* (2013.01); *H04W 16/28* (2013.01); *H04W 72/005* (2013.01); *H04W 74/08* (2013.01); *H04W 74/0833* (2013.01); *H04L 5/0026* (2013.01); *H04L 12/1881* (2013.01); *H04W 48/10* (2013.01); *H04W 48/12* (2013.01)

(58) Field of Classification Search
CPC .............................. H04W 16/28; H04W 48/20
See application file for complete search history.

(56) References Cited

U.S. PATENT DOCUMENTS

| | | | |
|---|---|---|---|
| 2008/0233960 A1 | 9/2008 | Kangude et al. | |
| 2012/0320874 A1* | 12/2012 | Li | H04W 48/12 370/331 |
| 2013/0077584 A1 | 3/2013 | Lee et al. | |
| 2014/0016593 A1 | 1/2014 | Park et al. | |

FOREIGN PATENT DOCUMENTS

| | | |
|---|---|---|
| CN | 101730257 A | 6/2010 |
| WO | 2014009246 A1 | 1/2014 |

\* cited by examiner

*Primary Examiner* — Zhensheng Zhang
(74) *Attorney, Agent, or Firm* — Slater Matsil, LLP

(57) ABSTRACT

Embodiments of the present invention provide a signal transmission method and a network device. The signal transmission method includes: sending, by a first network device, a first signal before performing cell selection; and sending, by the first network device, a second signal after performing cell selection, where resources used by the first network device to send the first signal and the second signal are different, and the second signal is a random access signal.

10 Claims, 4 Drawing Sheets

SIGNAL TRANSMISSION METHOD AND NETWORK DEVICE

CROSS-REFERENCE TO RELATED APPLICATIONS

This application is a continuation of International Application No. PCT/CN2015/078425, filed on May 7, 2015, the disclosure of which is hereby incorporated by reference in its entirety.

TECHNICAL FIELD

Embodiments of the present invention relate to the field of wireless communications technologies, and in particular, to a signal transmission method and a network device.

BACKGROUND

Development of wireless communications technologies has results in an ever-increasing data transmission rate of wireless communication. Spectrum resources for current use tend to saturation, and spectrum resources of higher frequencies need to be used for wireless communication. However, a higher frequency leads to a higher path loss.

In a high-frequency scenario, massive multiple-input multiple-output (Massive MIMO) antennas may be used to achieve a quite high antenna gain, so as to compensate for a path loss. Many antennas are included in the massive MIMO antennas, and a beam formed by each antenna is quite narrow, so that a high antenna gain can be achieved. However, the beam formed by each antenna in this way probably cannot cover all users in a cell.

Information about a synchronization channel, a broadcast channel, and a common channel needs to be sent to all users in a cell simultaneously. However, when massive MIMO antennas are used, because an antenna beam is relatively narrow, such information about the synchronization channel, the broadcast channel, and the common channel probably cannot be sent to all the users in the cell, and the users in the cell cannot normally perform access.

SUMMARY

Embodiments of the present invention provide a signal transmission method and a network device, to increase an access success rate of a network device.

A first aspect provides a signal transmission method. The method includes sending, by a first network device, a first signal before performing cell selection. The method also includes sending, by the first network device, a second signal after performing cell selection, where resources used by the first network device to send the first signal and the second signal are different, and the second signal is a random access signal.

With reference to the first aspect, in a first possible implementation of the first aspect, that the used resources are different includes one of the following: used code word resources are different; used time resources are different; used frequency resources are different; or used time-frequency resources are different.

With reference to the first aspect or the first possible implementation of the first aspect, in a second possible implementation of the first aspect, the sending, by a first network device, a first signal before performing cell selection includes: before performing cell selection, determining, by the first network device, a sequence in a first sequence group as a sequence of the first signal and sending the first signal, where the first sequence group is specific to a second network device group to which a second network device belongs, the second network device provides a cell to be selected by the first network device, and the first sequence group includes at least one sequence.

With reference to the second possible implementation of the first aspect, in a third possible implementation of the first aspect, the first sequence group is determined by using multicast signals, and the multicast signals are sent by at least two second network devices of the second network device group at the same time.

With reference to the first aspect or the first possible implementation of the first aspect, in a fourth possible implementation of the first aspect, the sending, by a first network device, a first signal before performing cell selection includes: before performing cell selection, determining, by the first network device, a sequence in a first sequence group as a sequence of the first signal and sending the first signal, where the first sequence group is determined by using a specific identifier of the first network device, and the specific identifier includes an IMSI or a TMSI.

With reference to the first aspect or the first possible implementation of the first aspect, in a fifth possible implementation of the first aspect, the sending, by a first network device, a first signal before performing cell selection includes: before performing cell selection, determining, by the first network device, a sequence in a first sequence group as a sequence of the first signal and sending the first signal, where the first sequence group is pre-defined.

With reference to any one of the first aspect or the first to the fifth possible implementations of the first aspect, in a sixth possible implementation of the first aspect, the sending, by a first network device, a first signal before performing cell selection includes: sending, by the first network device, the first signal on a specific frequency domain resource before performing cell selection.

With reference to the sixth possible implementation of the first aspect, in a seventh possible implementation of the first aspect, the specific frequency domain resource includes: a specific frequency domain resource within all frequency bands supported by the first network device.

With reference to any one of the first aspect or the first to the seventh possible implementations of the first aspect, in an eighth possible implementation of the first aspect, the sending, by a first network device, a first signal before performing cell selection includes: sending, by the first network device, the first signal on a specific time resource before performing cell selection.

With reference to the eighth possible implementation of the first aspect, in a ninth possible implementation of the first aspect, the sending, by the first network device, the first signal on a specific time resource before performing cell selection includes: repeatedly sending, by the first network device, the first signal in a first time period before performing cell selection; and the method further includes: stopping sending, by the first network device, the first signal in a second time period, where the first time period and the second time period are pre-defined.

With reference to the eighth possible implementation of the first aspect, in a tenth possible implementation of the first aspect, the sending, by the first network device, the first signal on a specific time resource before performing cell selection includes: if the first network device fails in performing random access and before the first network device performs cell selection, sending, by the first network device, the first signal on the specific time resource; and the method further includes: if the first network device successfully performs random access, stopping sending, by the first network device, the first signal.

With reference to any one of the first aspect or the first to the tenth possible implementations of the first aspect, in an eleventh possible implementation of the first aspect, the sending, by a first network device, a first signal before performing cell selection includes: sending, by the first network device, the first signal before performing cell selection and before detecting a synchronization signal.

With reference to any one of the first aspect or the first to the tenth possible implementations of the first aspect, in a twelfth possible implementation of the first aspect, the sending, by a first network device, a first signal before performing cell selection includes: sending, by the first network device, the first signal before performing cell selection and before detecting a broadcast signal.

With reference to any one of the first aspect or the first to the tenth possible implementations of the first aspect, in a thirteenth possible implementation of the first aspect, the sending, by a first network device, a first signal before performing cell selection includes: sending, by the first network device, the first signal before performing cell selection, after detecting a synchronization signal, and before detecting a broadcast signal.

With reference to any one of the first aspect or the first to the tenth possible implementations of the first aspect, in a fourteenth possible implementation of the first aspect, the sending, by a first network device, a first signal before performing cell selection includes: sending, by the first network device, the first signal before performing cell selection, after detecting a synchronization signal, and after detecting a broadcast signal.

With reference to any one of the first aspect or the first to the tenth possible implementations of the first aspect, in a fifteenth possible implementation of the first aspect, the sending, by a first network device, a first signal before performing cell selection includes: sending, by the first network device, the first signal before performing cell selection and after measuring a common pilot signal.

With reference to any one of the first aspect or the first to the tenth possible implementations of the first aspect, in a sixteenth possible implementation of the first aspect, the sending, by a first network device, a first signal before performing cell selection includes: sending, by the first network device, the first signal before performing cell selection and after measuring a pilot signal.

With reference to any one of the first aspect or the first to the sixteenth possible implementations of the first aspect, in a seventeenth possible implementation of the first aspect, before the sending, by the first network device, a second signal after performing cell selection, the method further includes: receiving, by the first network device, at least one third signal sent by at least one second network device of the second network device group; and performing, by the first network device, cell selection according to the at least one third signal.

With reference to the seventeenth possible implementation of the first aspect, in an eighteenth possible implementation of the first aspect, the performing, by the first network device, cell selection according to the at least one third signal includes: measuring, by the first network device, the at least one third signal, and selecting a cell provided by a second network device corresponding to a third signal with best signal quality.

With reference to any one of the first aspect or the first to the eighteenth possible implementations of the first aspect, in a nineteenth possible implementation of the first aspect, the first signal and the second signal are orthogonal to each other.

A second aspect provides a signal transmission method. The method includes receiving, by a second network device, a first signal sent by a first network device before the first network device performs cell selection. The method also includes receiving, by the second network device, a second signal sent by the first network device after the first network device performs cell selection, where resources used by the second network device to receive the first signal and the second signal are different, and the second signal is a random access signal.

With reference to the second aspect, in a first possible implementation of the second aspect, that the used resources are different includes one of the following: used code word resources are different; used time resources are different; used frequency resources are different; or used time-frequency resources are different.

With reference to the second aspect or the first possible implementation of the second aspect, in a second possible implementation of the second aspect, before the receiving, by a second network device, a first signal sent by a first network device before the first network device performs cell selection, the method further includes: sending, by the second network device, a multicast signal to the first network device, where the multicast signal includes a first sequence group, the first sequence group is specific to a second network device group to which the second network device belongs, a sequence of the first signal is selected from the first sequence group, and the first sequence group includes at least one sequence.

With reference to any one of the second aspect or the first or the second possible implementations of the second aspect, in a third possible implementation of the second aspect, before the receiving, by the second network device, a second signal sent by the first network device after the first network device performs cell selection, the method further includes: generating, by the second network device, a third signal according to the first signal; and sending, by the second network device, the third signal to the first network device, where the third signal is used to enable the first network device to perform cell selection.

With reference to the third possible implementation of the second aspect, in a fourth possible implementation of the second aspect, a time-frequency resource on which the second network device sends the third signal is variable.

With reference to the third or the fourth possible implementation of the second aspect, in a fifth possible implementation of the second aspect, a cycle in which the second network device sends the third signal is variable.

With reference to any one of the second aspect or the first to the fifth possible implementations of the second aspect, in a sixth possible implementation of the second aspect, before the receiving, by the second network device, a second signal sent by the first network device after the first network device performs cell selection, the method further includes: sending, by the second network device, a fourth signal to the first network device, where the fourth signal is a broadcast signal.

With reference to the sixth possible implementation of the second aspect, in a seventh possible implementation of the second aspect, a time-frequency resource on which the second network device sends the broadcast signal is variable.

With reference to the sixth or the seventh possible implementation of the second aspect, in an eighth possible implementation of the second aspect, a cycle in which the second network device sends the broadcast signal is variable.

With reference to any one of the second aspect or the first to the eighth possible implementations of the second aspect, in a ninth possible implementation of the second aspect, the first signal and the second signal are orthogonal to each other.

A third aspect provides a network device, where the network device is a first network device. The network device includes a sending module, configured to send a first signal before cell selection is performed. The network device also includes a processing module, configured to perform cell selection. The sending module is further configured to send a second signal after the processing module performs cell selection, where resources used by the sending module to send the first signal and the second signal are different, and the second signal is a random access signal.

With reference to the third aspect, in a first possible implementation of the third aspect, that the used resources are different includes one of the following: used code word resources are different; used time resources are different; used frequency resources are different; or used time-frequency resources are different.

With reference to the third aspect or the first possible implementation of the third aspect, in a second possible implementation of the third aspect, the sending module is specifically configured to: before the processing module performs cell selection, determine a sequence in a first sequence group as a sequence of the first signal and send the first signal, where the first sequence group is specific to a second network device group to which a second network device belongs, the second network device provides a cell to be selected by the first network device, and the first sequence group includes at least one sequence.

With reference to the second possible implementation of the third aspect, in a third possible implementation of the third aspect, the first sequence group is determined by using multicast signals, and the multicast signals are sent by at least two second network devices of the second network device group at the same time.

With reference to the third aspect or the first possible implementation of the third aspect, in a fourth possible implementation of the third aspect, the sending module is specifically configured to: before the processing module performs cell selection, determine a sequence in a first sequence group as a sequence of the first signal and send the first signal, where the first sequence group is determined by using a specific identifier of the first network device, and the specific identifier includes an IMSI or a TMSI.

With reference to the third aspect or the first possible implementation of the third aspect, in a fifth possible implementation of the third aspect, the sending module is specifically configured to: before the processing module performs cell selection, determine a sequence in a first sequence group as a sequence of the first signal and send the first signal, where the first sequence group is pre-defined.

With reference to any one of the third aspect or the first to the fifth possible implementations of the third aspect, in a sixth possible implementation of the third aspect, the sending module is specifically configured to send the first signal on a specific frequency domain resource before the processing module performs cell selection.

With reference to the sixth possible implementation of the third aspect, in a seventh possible implementation of the third aspect, the specific frequency domain resource includes: a specific frequency domain resource within all frequency bands supported by the first network device.

With reference to any one of the third aspect or the first to the seventh possible implementations of the third aspect, in an eighth possible implementation of the third aspect, the sending module is specifically configured to send the first signal on a specific time resource before the processing module performs cell selection.

With reference to the eighth possible implementation of the third aspect, in a ninth possible implementation of the third aspect, the sending module is specifically configured to repeatedly send the first signal in a first time period before the processing module performs cell selection; and the sending module is further configured to stop sending the first signal in a second time period, where the first time period and the second time period are pre-defined.

With reference to the eighth possible implementation of the third aspect, in a tenth possible implementation of the third aspect, the sending module is specifically configured to: if the first network device fails in performing random access and before the first network device performs cell selection, send the first signal on the specific time resource; and the sending module is further configured to: if the first network device successfully performs random access, stop sending the first signal.

With reference to any one of the third aspect or the first to the tenth possible implementations of the third aspect, in an eleventh possible implementation of the third aspect, the sending module is specifically configured to send the first signal before the processing module performs cell selection and before the processing module detects a synchronization signal.

With reference to any one of the third aspect or the first to the tenth possible implementations of the third aspect, in a twelfth possible implementation of the third aspect, the sending module is specifically configured to send the first signal before the processing module performs cell selection and before the processing module detects a broadcast signal.

With reference to any one of the third aspect or the first to the tenth possible implementations of the third aspect, in a thirteenth possible implementation of the third aspect, the sending module is specifically configured to send the first signal before the processing module performs cell selection, after the processing module detects a synchronization signal, and before the processing module detects a broadcast signal.

With reference to any one of the third aspect or the first to the tenth possible implementations of the third aspect, in a fourteenth possible implementation of the third aspect, the sending module is specifically configured to send the first signal before the processing module performs cell selection, after the processing module detects a synchronization signal, and after the processing module detects a broadcast signal.

With reference to any one of the third aspect or the first to the tenth possible implementations of the third aspect, in a fifteenth possible implementation of the third aspect, the sending module is specifically configured to send the first signal before the processing module performs cell selection and after the processing module measures a common pilot signal.

With reference to any one of the third aspect or the first to the tenth possible implementations of the third aspect, in a sixteenth possible implementation of the third aspect, the sending module is specifically configured to send the first signal before the processing module performs cell selection and after the processing module measures a pilot signal.

With reference to any one of the third aspect or the first to the sixteenth possible implementations of the third aspect, in a seventeenth possible implementation of the third aspect, the network device further includes: a receiving module, configured to: before the sending module sends the second signal after cell selection is performed, receive at least one third signal sent by at least one second network device of the second network device group; and the processing module is specifically configured to perform cell selection according to the at least one third signal.

With reference to the seventeenth possible implementation of the third aspect, in an eighteenth possible implementation of the third aspect, the processing module is specifically configured to measure the at least one third signal, and select a cell provided by a second network device corresponding to a third signal with best signal quality.

With reference to any one of the third aspect or the first to the eighteenth possible implementations of the third aspect, in a nineteenth possible implementation of the third aspect, the first signal and the second signal are orthogonal to each other.

A fourth aspect provides a network device, where the network device is a second network device. The network device includes a receiving module, configured to receive a first signal sent by a first network device before the first network device performs cell selection, and receive a second signal sent by the first network device after the first network device performs cell selection, where resources used by the receiving module to receive the first signal and the second signal are different, and the second signal is a random access signal.

With reference to the fourth aspect, in a first possible implementation of the fourth aspect, that the used resources are different includes one of the following: used code word resources are different; used time resources are different; used frequency resources are different; or used time-frequency resources are different.

With reference to the fourth aspect or the first possible implementation of the fourth aspect, in a second possible implementation of the fourth aspect, the network device further includes a sending module, configured to: before the receiving module receives the first signal sent by the first network device before the first network device performs cell selection, send a multicast signal to the first network device, where the multicast signal includes a first sequence group, the first sequence group is specific to a second network device group to which the second network device belongs, a sequence of the first signal is selected from the first sequence group, and the first sequence group includes at least one sequence.

With reference to any one of the fourth aspect or the first and the second possible implementations of the fourth aspect, in a third possible implementation of the fourth aspect, the network device further includes: a processing module, configured to: before the receiving module receives the second signal sent by the first network device after the first network device performs cell selection, generate a third signal according to the first signal; and the sending module is further configured to send the third signal to the first network device, where the third signal is used to enable the first network device to perform cell selection.

With reference to the third possible implementation of the fourth aspect, in a fourth possible implementation of the fourth aspect, a time-frequency resource on which the sending module sends the third signal is variable.

With reference to the third or the fourth possible implementation of the fourth aspect, in a fifth possible implementation of the fourth aspect, a cycle in which the sending module sends the third signal is variable.

With reference to any one of the fourth aspect or the first to the fifth possible implementations of the fourth aspect, in a sixth possible implementation of the fourth aspect, the sending module is further configured to: before the receiving module receives the second signal sent by the first network device after the first network device performs cell selection, send a fourth signal to the first network device, where the fourth signal is a broadcast signal.

With reference to the sixth possible implementation of the fourth aspect, in a seventh possible implementation of the fourth aspect, a time-frequency resource on which the sending module sends the broadcast signal is variable.

With reference to the sixth or the seventh possible implementation of the fourth aspect, in an eighth possible implementation of the fourth aspect, a cycle in which the sending module sends the broadcast signal is variable.

With reference to any one of the fourth aspect or the first to the eighth possible implementations of the fourth aspect, in a ninth possible implementation of the fourth aspect, the first signal and the second signal are orthogonal to each other.

According to the signal transmission method and the network device provided in the embodiments of the present invention, a first network device sends a first signal before performing cell selection and sends a second signal after performing cell selection. Resources used by the first network device to send the first signal and the second signal are different. Therefore, before the first network device performs cell selection, a second network device providing a network access capability can learn related information of the first network device, so that the second network device can send, to the first network device according to the related information of the first network device, information helpful for the first network device to perform cell selection. This increases a success rate of performing cell selection by the first network device and further increases an access success rate of the first network device.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
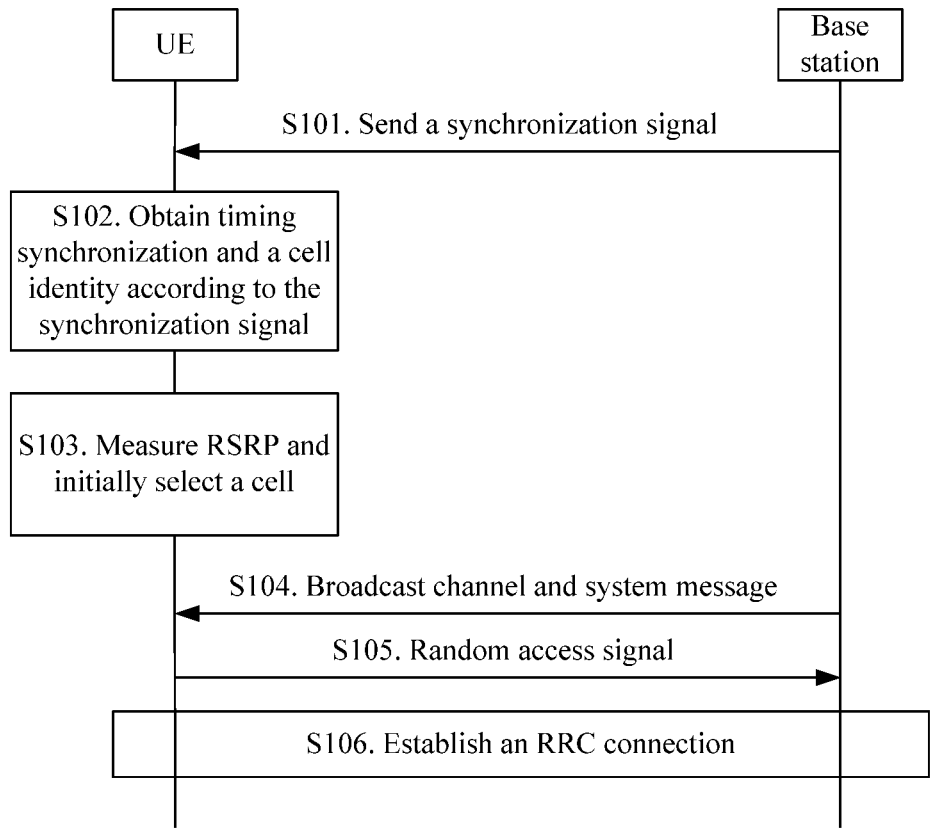
FIG. 1 is an LTE initial access procedure.

In the wireless communications field, user equipment (UE) needs to access a base station before performing data transmission on a resource allocated by the base station to the user equipment. Using a Long Term Evolution (LTE) system as an example, FIG. 1 is an LTE initial access procedure. As shown in FIG. 1, in step S101, a base station sends a synchronization signal. In step S102, after obtaining, by means of detection, the synchronization signal sent by the base station, UE obtains timing synchronization and a cell identity (ID) according to the synchronization signal. In step S103, the UE obtains a location of a cell-specific reference signal (CRS) according to the cell ID, measures reference signal received power (RSRP), initially selects a cell, and camps on the initially selected cell. In step S104, the UE detects a broadcast channel and a system message according to the CRS, to obtain a system message of the cell. In step S105, the UE initiates random access and sends a random access signal to the base station. In step S106, after the base station processes a random access request sent by the UE, the UE establishes a radio resource control (RRC) connection to a network.

It can be learned that, in an initial access process, the base station needs to send a synchronization signal first, and a subsequent access procedure can be performed only after the UE obtains, by means of detection, the synchronization signal sent by the base station. However, in a high-frequency scenario, if the base station uses massive MIMO antennas, a beam formed by the base station is quite narrow. Consequently, the synchronization signal sent by the base station probably cannot be received by the UE, and the UE cannot access the base station normally.

To resolve the foregoing problem, an improvement is made to the existing access procedure in the embodiments of this application. Before the base station sends the synchronization signal, the UE first sends a first signal. After the first signal is received by the base station, the base station can learn a location of the UE, steer a beam direction toward the location of the UE, and send the synchronization signal. Therefore, the UE can receive the synchronization signal normally, so as to complete the access procedure.

In the following embodiments of the present invention, a first network device represents UE, a terminal device, or any other network device that needs to perform access during wireless communication. A second network device represents a base station or any other network device providing an access resource and sending a synchronization signal during wireless communication.

Figure 2:
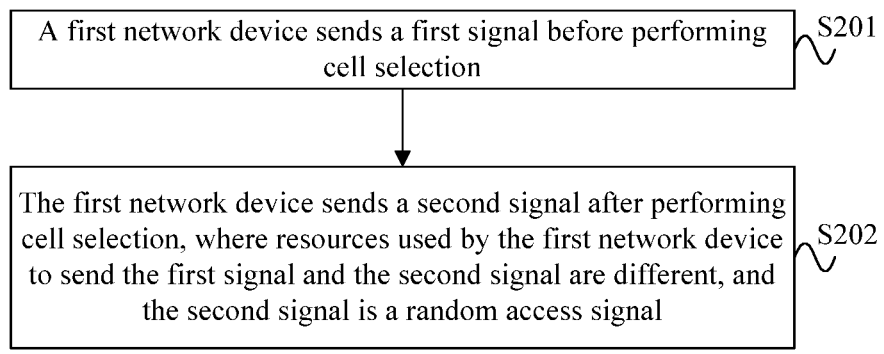
FIG. 2 is a flowchart of Embodiment 1 of a signal transmission method according to an embodiment of the present invention.

FIG. 2 is a flowchart of Embodiment 1 of a signal transmission method according to an embodiment of the present invention. As shown in FIG. 2, the method in this embodiment includes the following steps.

Step S201. A first network device sends a first signal before performing cell selection.

Specifically, it can be learned according to the LTE initial access procedure shown in FIG. 1 that, in the initial access procedure, a signal first sent by the UE to the base station is a random access signal. In addition, the random access signal is sent by the UE only after the UE completes cell selection after obtaining, by means of detection, a synchronization signal sent by the base station. This causes a problem that the UE cannot receive the synchronization signal sent by the base station and cannot complete access.

In this embodiment, the first network device sends the first signal before performing cell selection. That is, before determining a cell to be accessed and before sending a random access signal, the first network device first sends the first signal to a second network device. A function of the first signal is to enable the second network device to learn a location of the first network device, so that the second network device can adjust a beam to enable the first network device to receive a related signal sent by the second network device.

The first network device may send the first signal at any moment before performing cell selection. That the first network device performs cell selection means: The first network device determines a cell to be accessed or a cell to be camped on. In a running state, the first network device has two modes in a network: a connected (CONNECTED) mode and an idle (IDLE) mode. The access procedure shown in FIG. 1 depicts a case in which the first network device enters the connected mode. If the first network device needs to enter the idle mode, after step S103, the first network device stops the access procedure and camps on an initially selected cell only. It can be learned that, regardless of which mode the first network device needs to switch to, the connected mode or the idle mode, an objective of sending the first signal by the first network device is to perform cell selection.

The first network device may send the first signal before receiving a synchronization signal sent by the second network device. In this case, sending the first signal by the first network device may enable the second network device to learn the location or other related information of the first network device. This can ensure that the synchronization signal sent by the second network device is received by the first network device. The first network device may alternatively send the first signal after receiving a synchronization signal sent by the second network device and before performing cell selection. The second network device sends the synchronization signal to the first network device, and before the first network device accesses, the second network device further needs to send a measurement pilot, a broadcast channel, system information, or other information. The first network device needs to measure the measurement pilot sent by the second network device so as to perform cell selection. If the first network device obtains, by means of detection, the synchronization signal sent by the second network device, but does not obtain, by means of detection, the measurement pilot or another signal sent by the second network device, the first network device still cannot perform access. Therefore, the first network device sends the first signal after receiving the synchronization signal sent by the second network device and before performing cell selection, so that the second network device can determine a beam for sending the measurement pilot or another signal.

Step S202. The first network device sends a second signal after performing cell selection, where resources used by the first network device to send the first signal and the second signal are different, and the second signal is a random access signal.

Specifically, after the first network device performs cell selection, that is, the first network device determines the cell to be accessed, the first network device may perform a subsequent access procedure. A manner of performing access by the first network device is sending the second signal to the second network device. The second signal is the random access signal.

After the first network device sends the first signal, when receiving the first signal, the second network device can learn related information of the first network device according to the first signal. Therefore, the second network device can send, to the first network device, information helpful for the first network device to perform cell selection, so that the first network device can better perform cell selection.

The resources used by the first network device to send the first signal and the second signal are different. That is, a resource used by the first network device to send the first signal is different from that used by the first network device to send the random access signal. The first network device may send the first signal by using a dedicated resource. In this case, the second network device can receive the first signal and the second signal on respective different resources. Allocating the dedicated resource to the first signal can avoid a collision between the first signal and the second signal, ensuring that the first signal sent by the first network device is received by the second network device, and increasing a success rate of performing cell selection by the first network device.

In this embodiment, a first network device sends a first signal before performing cell selection and sends a second signal after performing cell selection. Resources used by the first network device to send the first signal and the second signal are different. Therefore, before the first network device performs cell selection, a second network device providing a network access capability can learn related information of the first network device, so that the second network device can send, to the first network device according to the related information of the first network device, information helpful for the first network device to perform cell selection. This increases a success rate of performing cell selection by the first network device and further increases an access success rate of the first network device.

It should be noted that, in the embodiment shown in FIG. 2, that resources used by the first network device to send the first signal and the second signal are different includes: Code word resources used by the first network device to send the first signal and the second signal are different, or time resources used by the first network device to send the first signal and the second signal are different, or frequency resources used by the first network device to send the first signal and the second signal are different, or time-frequency resources used by the first network device to send the first signal and the second signal are different.

Specifically, that resources used by the first network device to send the first signal and the second signal are different may be described from multiple perspectives. That code word resources used by the first network device to send the first signal and the second signal are different may be:

The first signal and the second signal that are sent by the first network device may use different sequences. That time resources used by the first network device to send the first signal and the second signal are different may be: The first network device sends the first signal and the second signal in different subframes, or sends the first signal and the second signal at different moments, or sends the first signal and the second signal in different cycles. That frequency resources used by the first network device to send the first signal and the second signal are different may be: The first network device sends the first signal and the second signal on different frequencies of a same frequency band, or sends the first signal and the second signal on carriers of different frequency bands. That time-frequency resources used by the first network device to send the first signal and the second signal are different may be: The first network device sends the first signal and the second signal on different resource blocks.

Further, in the embodiment shown in FIG. 2, step S201 specifically includes: Before performing cell selection, the first network device determines a sequence in a first sequence group as a sequence of the first signal and sends the first signal, where the first sequence group is specific to a second network device group to which a second network device belongs, the second network device provides a cell to be selected by the first network device, and the first sequence group includes at least one sequence.

Specifically, the sequence used by the first network device to send the first signal may be selected from the first sequence group. The first sequence group is specific to the second network device group to which the second network device belongs, and the second network device provides the cell to be selected by the first network device. When the first network device needs to perform cell selection, there may be several cells that can be accessed by the first network device. That is, there may be several second network devices providing the cells that can be accessed by the first network device. Therefore, when the first network device determines a cell that needs to be accessed, selection may be performed on multiple cells that can be accessed. In general, a second network device in a region may provide an access service for a first network device in the same region. Second network devices in the region may be used as a second network device group. When the first network device sends the first signal, cell selection has not been performed, that is, a second network device that needs to be accessed is not determined. Therefore, the first network device may select, in a first sequence group specific to the second network device group, a sequence as a sequence of the first signal and send the first signal. Because the first sequence group is specific to the second network device group, each second network device of the second network device group may receive and parse the first signal. Therefore, each second network device of the second network device group may send related information to the first network device according to the first signal, so that the first network device performs cell selection according to the information sent by each second network device. The first sequence group may be a set of several sequences. The first sequence group includes at least one sequence.

Further, when the first network device determines the sequence in the first sequence group as the sequence of the first signal and sends the first signal, the first sequence group is specific to the second network device group to which the second network device belongs, and the second network device provides the cell to be selected by the first network device. The first sequence group is determined by using multicast signals. The multicast signals are sent by at least two second network devices of the second network device group at the same time. Multicast sending means that each second network device of the second network device group sends the first sequence group. The multicast signal sent by each network device of the second network device group can be received by the first network device before the first network device accesses and sends the first signal. Therefore, the first network device may send the first signal after obtaining the multicast signals sent by the at least two second network devices of the second network device group.

Further, in the embodiment shown in FIG. 2, step S201 specifically includes: Before performing cell selection, the first network device determines a sequence in a first sequence group as a sequence of the first signal and sends the first signal, where the first sequence group is determined by using a specific identifier of the first network device, and the specific identifier includes an international mobile subscriber identity (IMSI) or a temporary mobile subscriber identity (TMSI).

Specifically, different from the foregoing first signal, the sequence used by the first signal sent by the first network device before the first network device performs cell selection may be selected from the first sequence group, but the first sequence group is determined by using the specific identifier of the first network device. The specific identifier includes the IMSI or TMSI of the first network device, or other identification information that can represent a characteristic of the first network device. In this case, the first signal sent by the first network device also has unique characteristic information. After receiving the first signal, the second network device may obtain the specific identifier of the first network device sending the first signal, so as to determine an identity of the first network device. Further, the second network device may send different information to the first network device according to the specific identifier of the first network device by using different policies.

Optionally, the first network device may alternatively select a sequence from a pre-defined first sequence group as a sequence of the first signal. The fixed first sequence group is also pre-defined on the second network device. Therefore, the second network device can also receive the first signal sent by the first network device.

Optionally, in the embodiment shown in FIG. 2, step S201 specifically includes: The first network device sends the first signal on a specific frequency domain resource before performing cell selection. Specifically, a first center frequency on which the first network device sends the first signal may be selected from a first center frequency set. The first center frequency set may be a fixed set. For example, the first center frequency set is (f1, f2, f3, f4). f1, f2, f3, and f4 may be carrier frequencies within different frequency bands or carrier frequencies within a same frequency band. The first network device may select a frequency from f1, f2, f3, and f4 to send the first signal or send the first signal on all the frequencies. That is, the specific frequency domain resource includes a specific frequency domain resource within all frequency bands or within a frequency band supported by the first network device. Alternatively, the first center frequency on which the first network device sends the first signal is a fixed frequency. In addition, a bandwidth in which the first network device sends the first signal may be fixed, for example, at least one of B1, B2, or B3.

Optionally, in the embodiment shown in FIG. 2, step S201 specifically includes: The first network device sends the first signal on a specific time resource before performing cell selection. Specifically, time at which the first network device sends the first signal may be fixed, for example, (t1, t2, t3, t4). Alternatively, a time interval at which the first network device sends the first signal is fixed, for example, Δt1, Δt2, Δt3, Δt4, . . . Δtn.

Optionally, in the embodiment shown in FIG. 2, step S201 specifically includes: The first network device repeatedly sends the first signal in a first time period before performing cell selection. The signal transmission method provided in this embodiment of the present invention further includes: The first network device stops sending the first signal in a second time period. The first time period and the second time period are pre-defined. In addition, times of repeatedly sending the first signal by the first network device in the first time period may also be pre-defined.

Optionally, power used by the first network device to send the first signal may be pre-defined.

Optionally, in the embodiment shown in FIG. 2, step S201 specifically includes: If the first network device fails in performing random access and before the first network device performs cell selection, the first network device sends the first signal on a specific time resource. The signal transmission method provided in this embodiment of the present invention further includes: If the first network device successfully performs random access, the first network device stops sending the first signal. Specifically, an objective of sending the first signal by the first network device before performing cell selection is to enable the second network device to learn related information of the first network device, so that the first network device can better perform cell selection. If the first network device fails in performing random access, the first network device needs to re-perform cell selection. In this case, the first network device may continue sending the first signal on the specific time resource. If the first network device successfully performs random access, the first network device stops sending the first signal. Therefore, it can be ensured that the first network device successfully performs random access.

According to the random access process shown in FIG. 1, the first network device at least needs to detect a synchronization signal and a broadcast signal and measure a common pilot in the random access process. In the signal sending method shown in FIG. 2, the first network device may send the first signal before performing cell selection and before detecting a synchronization signal. The first network device may alternatively send the first signal before performing cell selection and before detecting a broadcast signal. The first network device may alternatively send the first signal before performing cell selection, after detecting a synchronization signal, and before detecting a broadcast signal. Alternatively, the first network device may send the first signal before performing cell selection, after detecting a synchronization signal, and after detecting a broadcast signal. In addition, the first network device may alternatively send the first signal before performing cell selection and after measuring a common pilot signal. The first network device may alternatively send the first signal before performing cell selection and after measuring a pilot signal.

Figure 3:
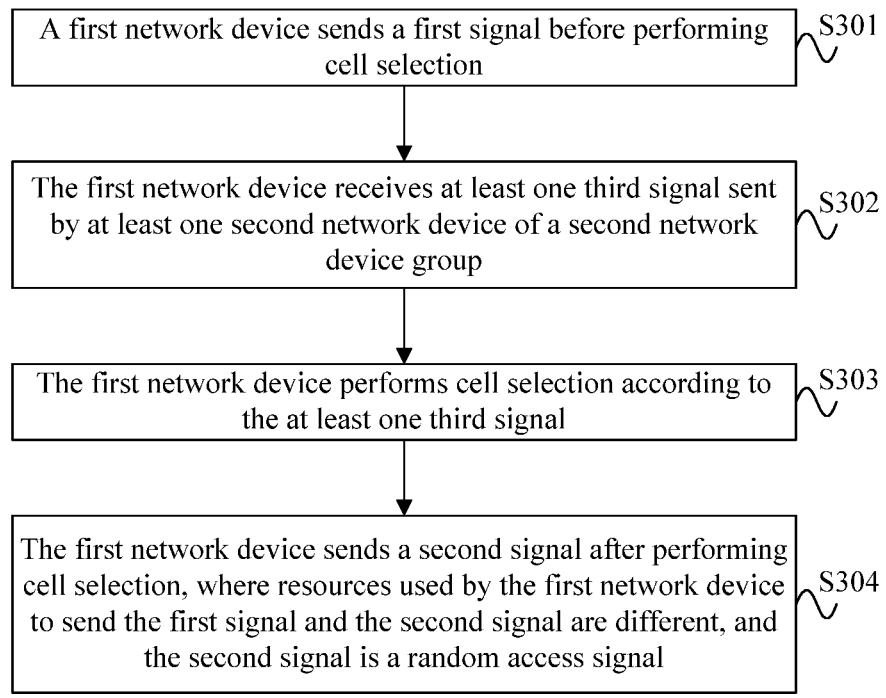
FIG. 3 is a flowchart of Embodiment 2 of a signal transmission method according to an embodiment of the present invention.

FIG. 3 is a flowchart of Embodiment 2 of a signal transmission method according to an embodiment of the present invention. As shown in FIG. 3, a method in this embodiment includes the following steps.

Step S301. A first network device sends a first signal before performing cell selection.

Step S302. The first network device receives at least one third signal sent by at least one second network device of a second network device group.

Specifically, an objective of sending the first signal by the first network device is to better perform cell selection. In a region in which the first network device is located, there may be at least one second network device having a capability to provide a network service. Second network devices, having the capability to provide a network service, in the region in which the first network device is located form the second network device group. The first signal sent by the first network device can be received by at least one second network device of the second network device group. After receiving the first signal, to enable the first network device to perform cell selection, a second network device capable to provide an access service for the first network device sends a third signal to the first network device. A function of the third signal is to enable the first network device to perform cell selection. The third signal may be a synchronization signal. Alternatively, the third signal may be a measurement pilot, a broadcast signal, or another signal. The first network device receives the at least one third signal sent by the at least one second network device of the second network device group.

Step S303. The first network device performs cell selection according to the at least one third signal.

Specifically, after receiving the at least one third signal, the first network device performs cell selection according to the at least one third signal. The first network device may randomly select a cell from cells indicated by the third signal. Alternatively, the first network device may measure the at least one third signal and select a cell corresponding to a measured third signal with best signal quality. Alternatively, after receiving the at least one third signal, the first network device may send a measurement message to each second network device that sends the third signal, and then perform cell selection according to a measurement result sent by the second network device.

Step S304. The first network device sends a second signal after performing cell selection, where resources used by the first network device to send the first signal and the second signal are different, and the second signal is a random access signal.

In this embodiment, a first network device sends a first signal before performing cell selection, performs cell selection according to a third signal sent by at least one second network device of a second network device group, and sends a second signal after performing cell selection. Resources used by the first network device to send the first signal and the second signal are different. Therefore, before the first network device performs cell selection, a second network device providing a network access capability can learn related information of the first network device, so that the second network device can send, to the first network device according to the related information of the first network device, the third signal helpful for the first network device to perform cell selection. This increases a success rate of performing cell selection by the first network device and further increases an access success rate of the first network device.

Further, the embodiments shown in FIG. 2 and FIG. 3 further include: The first signal and the second signal are orthogonal to each other. That the first signal and the second signal are orthogonal to each other may avoid interference between the first signal and the second signal, so as to ensure that both the first signal and the second signal are received by the second network device, and to further increase a success rate of performing cell selection by the first network device.

Figure 4:
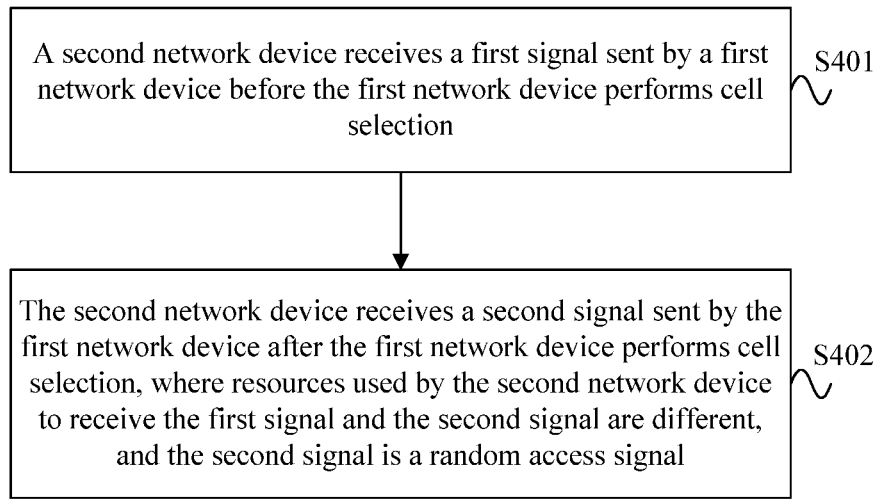
FIG. 4 is a flowchart of Embodiment 3 of a signal transmission method according to an embodiment of the present invention.

FIG. 4 is a flowchart of Embodiment 3 of a signal transmission method according to an embodiment of the present invention. As shown in FIG. 4, a method in this embodiment includes the following steps.

Step S401. A second network device receives a first signal sent by a first network device before the first network device performs cell selection.

Specifically, it can be learned according to the LTE initial access procedure shown in FIG. 1 that, in the initial access procedure, a signal first sent by the UE to the base station is a random access signal. In addition, the random access signal is sent by the UE only after the UE completes cell selection after obtaining, by means of detection, a synchronization signal sent by the base station. This causes a problem that the UE cannot receive the synchronization signal sent by the base station and cannot complete access.

In this embodiment, before the first network device performs cell selection, the second network device first receives the first signal sent by the first network device. That is, before determining a cell to be accessed and before sending a random access signal, the first network device first sends the first signal to the second network device. A function of the first signal is to enable the second network device to learn a location of the first network device, so that the second network device can adjust a beam to enable the first network device to receive a related signal sent by the second network device.

The second network device may receive, at any moment before the first network device performs cell selection, the first signal sent by the first network device. That the first network device performs cell selection means: The first network device determines a cell to be accessed or a cell to be camped on. In a running state, the first network device has two modes in a network: a connected (CONNECTED) mode and an idle (IDLE) mode. The access procedure shown in FIG. 1 depicts a case in which the first network device enters the connected mode. If the first network device needs to enter the idle mode, after step S103, the first network device stops the access procedure and camps on an initially selected cell only. It can be learned that, regardless of which mode the first network device needs to switch to, the connected mode or the idle mode, an objective of sending the first signal by the first network device is to perform cell selection.

Before sending a synchronization signal to the first network device, the second network device may receive the first signal sent by the first network device. In this case, the second network device can learn the location or other related information of the first network device according to the first signal. This can ensure that the synchronization signal sent by the second network device is received by the first network device. The second network device may alternatively receive, after sending a synchronization signal to the first network device and before the first network device performs cell selection, the first signal sent by the first network device. The second network device sends the synchronization signal to the first network device, and before the first network device accesses, the second network device further needs to send a measurement pilot, a broadcast channel, system information, or other information. The first network device needs to measure the measurement pilot sent by the second network device so as to perform cell selection. If the first network device obtains, by means of detection, the synchronization signal sent by the second network device, but does not obtain, by means of detection, the measurement pilot or another signal sent by the second network device, the first network device still cannot perform access. Therefore, after the second network device sends the synchronization signal to the first network device and before the first network device performs cell selection, the second network device receives the first signal sent by the first network device, so that the second network device can determine a beam for sending the measurement pilot or another signal.

Step S402. The second network device receives a second signal sent by the first network device after the first network device performs cell selection, where resources used by the second network device to receive the first signal and the second signal are different, and the second signal is a random access signal.

Specifically, after the first network device performs cell selection, that is, the first network device determines the cell to be accessed, the first network device may perform a subsequent access procedure. After receiving the second signal sent by the first network device, the second network device may continue the subsequent access procedure of the first network device. The second signal is the random access signal.

After receiving the first signal sent by the first network device, the second network device can learn related information of the first network device according to the first signal. Therefore, the second network device can send, to the first network device, information helpful for the first network device to perform cell selection, so that the first network device can better perform cell selection.

The resources used by the second network device to receive the first signal and the second signal are different. That is, a resource used by the second network device to receive the first signal is different from that used by the second network device to receive the random access signal. The second network device may receive the first signal by using a dedicated resource. In this case, the second network device can receive the first signal and the second signal on respective different resources. Allocating the dedicated resource to the first signal can avoid a collision between the first signal and the second signal, ensuring that the second network device correctly receives the first signal, and increasing a success rate of performing cell selection by the first network device.

In this embodiment, a second network device receives a first signal sent by a first network device before the first network device performs cell selection and receives a second signal sent by the first network device after the first network device performs cell selection. Resources used by the second network device to receive the first signal and the second signal are different. Therefore, before the first network device performs cell selection, a second network device providing a network access capability can learn related information of the first network device, so that the second network device can send, to the first network device according to the related information of the first network device, information helpful for the first network device to perform cell selection. This increases a success rate of performing cell selection by the first network device and further increases an access success rate of the first network device.

It should be noted that, in the embodiment shown in FIG. 4, that resources used by the second network device to receive the first signal and the second signal are different includes: Code word resources used by the second network device to receive the first signal and the second signal are different, or time resources used by the second network device to receive the first signal and the second signal are different, or frequency resources used by the second network device to receive the first signal and the second signal are different, or time-frequency resources used by the second network device to receive the first signal and the second signal are different.

Specifically, that resources used by the second network device to receive the first signal and the second signal are different may be described from multiple perspectives. That code word resources used by the second network device to receive the first signal and the second signal are different may be: The first signal and the second signal received by the second network device may use different sequences. That time resources used by the second network device to receive the first signal and the second signal are different may be: The second network device receives the first signal and the second signal in different subframes, or receives the first signal and the second signal at different moments, or cycles in which the second network device receives the first signal and the second signal are different. That frequency resources used by the second network device to receive the first signal and the second signal are different may be: The second network device receives the first signal and the second signal on different frequencies of a same frequency band, or receives the first signal and the second signal on carriers of different frequency bands. That time-frequency resources used by the second network device to receive the first signal and the second signal are different may be: The second network device receives the first signal and the second signal on different resource blocks (block).

Optionally, before step S401 in the embodiment shown in FIG. 4, the method further includes: The second network device sends a multicast signal to the first network device, where the multicast signal includes a first sequence group, the first sequence group is specific to a second network device group to which the second network device belongs, a sequence of the first signal is selected from the first sequence group, and the first sequence group includes at least one sequence.

Specifically, a sequence used by the second network device to receive the first signal may be selected by the first network device from the first sequence group. The first sequence group is specific to the second network device group to which the second network device belongs, and the second network device provides the cell to be selected by the first network device. When the first network device needs to perform cell selection, there may be several cells that can be accessed by the first network device. That is, there may be several second network devices providing the cells that can be accessed by the first network device. Therefore, when the first network device determines a cell that needs to be accessed, selection may be performed on multiple cells that can be accessed. In general, a second network device in a region may provide an access service for a first network device in the same region. Second network devices in the region may be used as a second network device group. When the first network device sends the first signal, cell selection has not been performed, that is, a second network device that needs to be accessed is not determined. Therefore, the first network device may select, in a first sequence group specific to the second network device group, a sequence as a sequence of the first signal and send the first signal. Because the first sequence group is specific to the second network device group, each second network device of the second network device group may receive and parse the first signal. Therefore, each second network device of the second network device group may send related information to the first network device according to the first signal, so that the first network device performs cell selection according to the information sent by each second network device. The first sequence group may be a set of several sequences. The first sequence group includes at least one sequence.

When the first network device determines the sequence in the first sequence group as the sequence of the first signal and sends the first signal, the first sequence group is specific to the second network device group to which the second network device belongs, and the second network device provides the cell to be selected by the first network device. Therefore, before receiving the first signal sent by the first network device, the second network device further needs to send the first sequence group to the first network device. The first sequence group is determined by using multicast signals. The multicast signals are sent by at least two second network devices of the second network device group at the same time. Multicast sending means that each second network device of the second network device group sends the first sequence group. The multicast signal sent by each network device of the second network device group can be received by the first network device before the first network device accesses and sends the first signal. Therefore, the first network device may send the first signal after obtaining the multicast signals sent by the at least two second network devices of the second network device group.

Figure 5:
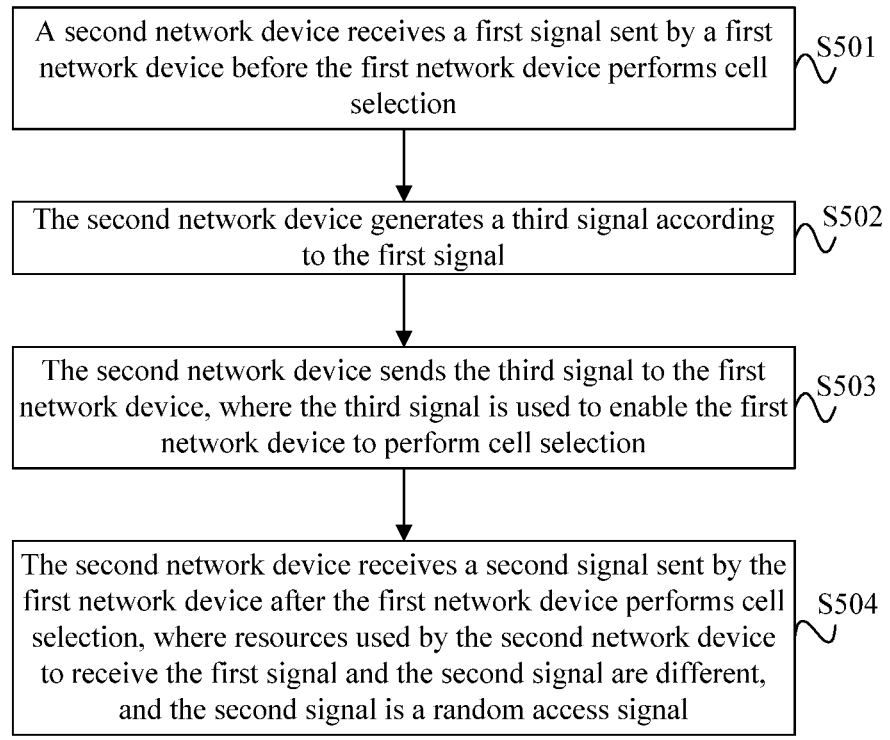
FIG. 5 is a flowchart of Embodiment 4 of a signal transmission method according to an embodiment of the present invention.

FIG. 5 is a flowchart of Embodiment 4 of a signal transmission method according to an embodiment of the present invention. As shown in FIG. 5, a method in this embodiment includes the following steps.

Step S501. A second network device receives a first signal sent by a first network device before the first network device performs cell selection.

Step S502. The second network device generates a third signal according to the first signal.

Step S503. The second network device sends the third signal to the first network device, where the third signal is used to enable the first network device to perform cell selection.

Specifically, an objective of sending the first signal by the first network device is to better perform cell selection. In a region in which the first network device is located, there may be at least one second network device having a capability to provide a network service. Second network devices, having the capability to provide a network service, in the region in which the first network device is located form the second network device group. The first signal sent by the first network device can be received by at least one second network device of the second network device group. If a second network device having received the first signal is capable to provide an access service for the first network device, to enable the first network device to perform cell selection, the second network device sends the third signal to the first network device. The second network device can learn related information of the first network device according to the received first signal, so as to generate the third signal according to the first signal. A function of the third signal is to enable the first network device to perform cell selection. The third signal may be a synchronization signal. Alternatively, the third signal may be a measurement pilot, a broadcast signal, or another signal.

Step S504. The second network device receives a second signal sent by the first network device after the first network device performs cell selection, where resources used by the second network device to receive the first signal and the second signal are different, and the second signal is a random access signal.

In this embodiment, a second network device receives a first signal sent by a first network device before the first network device performs cell selection, and the second network device generates a third signal according to the first signal, sends the third signal to the first network device, and receives a second signal sent by the first network device after the first network device performs cell selection. Resources used by the first network device to send the first signal and the second signal are different. Therefore, before the first network device performs cell selection, a second network device providing a network access capability can learn related information of the first network device, so that the second network device can send, to the first network device according to the related information of the first network device, the third signal helpful for the first network device to perform cell selection. This increases a success rate of performing cell selection by the first network device and further increases an access success rate of the first network device.

Further, in the embodiment shown in FIG. 5, a time-frequency resource on which the second network device sends the third signal is variable. A cycle in which the second network device sends the third signal is variable. That is, the second network device may send the third signal according to a need. An objective of sending the third signal to the first network device by the second network device is to enable the first network device to perform cell selection. In addition, the third signal is generated according to the first signal. Therefore, after receiving the first signal and obtaining the related information of the first network device, the second network device may send, to the first network device, the third signal on a time-frequency resource and/or in a cycle on/in which the first network device can receive the third signal.

Further, it can be learned according to the access procedure shown in FIG. 1, after performing initial cell selection, the UE further needs to detect a broadcast signal. The broadcast signal is also sent by the base station. Therefore, in the embodiments shown in FIG. 4 and FIG. 5, before the second network device receives the second signal sent by the first network device after the first network device performs cell selection, the method further includes: The second network device sends a fourth signal to the first network device, where the fourth signal is a broadcast signal. Sending the broadcast signal to the first network device by the second network device is to enable the first network device to detect a system message of a cell, so that the first network device initiates random access, that is, sends the second signal. A time-frequency resource on which the second network device sends the broadcast signal is variable. A cycle in which the second network device sends the broadcast signal is variable.

Further, the embodiments shown in FIG. 4 and FIG. 5 further include: The first signal and the second signal are orthogonal to each other. That the first signal and the second signal are orthogonal to each other may avoid interference between the first signal and the second signal, so as to ensure that both the first signal and the second signal are received by the second network device, and to further increase a success rate of performing cell selection by the first network device.

Figure 6:
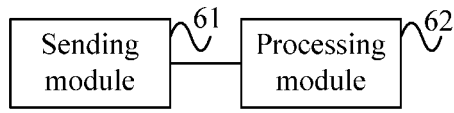
FIG. 6 is a schematic structural diagram of Embodiment 1 of a network device according to an embodiment of the present invention.

FIG. 6 is a schematic structural diagram of Embodiment 1 of a network device according to an embodiment of the present invention. The network device in this embodiment is a first network device. As shown in FIG. 6, the network device in this embodiment includes: a sending module 61, configured to send a first signal before cell selection is performed; and a processing module 62, configured to perform cell selection, where the sending module 61 is further configured to send a second signal after the processing module 62 performs cell selection, where resources used by the sending module 61 to send the first signal and the second signal are different, and the second signal is a random access signal.

The network device in this embodiment is configured to execute the technical solution in the method embodiment shown in FIG. 2. An implementation principle and a technical effect of the network device in this embodiment are similar to those of the method embodiment shown in FIG. 2, and details are not repeated herein.

Further, in the embodiment shown in FIG. 6, that resources used by the sending module 61 to send the first signal and the second signal are different includes: Code word resources used by the sending module 61 to send the first signal and the second signal are different, or time resources used by the sending module 61 to send the first signal and the second signal are different, or frequency resources used by the sending module 61 to send the first signal and the second signal are different, or time-frequency resources used by the sending module 61 to send the first signal and the second signal are different.

Further, in the embodiment shown in FIG. 6, the sending module 61 is specifically configured to: before the processing module 62 performs cell selection, determine a sequence in a first sequence group as a sequence of the first signal and send the first signal, where the first sequence group is specific to a second network device group to which a second network device belongs, the second network device provides a cell to be selected by the first network device, and the first sequence group includes at least one sequence.

Further, in the embodiment shown in FIG. 6, the first sequence group is determined by using multicast signals, and the multicast signals are sent by at least two second network devices of the second network device group at the same time.

Further, in the embodiment shown in FIG. 6, the sending module 61 is specifically configured to: before the processing module 62 performs cell selection, determine a sequence in a first sequence group as a sequence of the first signal and send the first signal, where the first sequence group is determined by using a specific identifier of the first network device, and the specific identifier includes an IMSI or a TMSI.

Further, in the embodiment shown in FIG. 6, the sending module 61 is specifically configured to: before the processing module 62 performs cell selection, determine a sequence in a first sequence group as a sequence of the first signal and send the first signal, where the first sequence group is pre-defined.

Further, in the embodiment shown in FIG. 6, the sending module 61 is specifically configured to send the first signal on a specific frequency domain resource before the processing module 62 performs cell selection.

Further, in the embodiment shown in FIG. 6, the specific frequency domain resource includes a specific frequency domain resource within all frequency bands supported by the first network device.

Further, in the embodiment shown in FIG. 6, the sending module 61 is specifically configured to send the first signal on a specific time resource before the processing module 62 performs cell selection.

Further, in the embodiment shown in FIG. 6, the sending module 61 is specifically configured to repeatedly send the first signal in a first time period before the processing module 62 performs cell selection; and the sending module 61 is further configured to stop sending the first signal in a second time period. The first time period and the second time period are pre-defined.

Further, in the embodiment shown in FIG. 6, the sending module 61 is specifically configured to: if the first network device fails in performing random access and before the first network device performs cell selection, send the first signal on the specific time resource; and the sending module 61 is further configured to: if the first network device successfully performs random access, stop sending the first signal.

Further, in the embodiment shown in FIG. 6, the sending module 61 is specifically configured to send the first signal before the processing module 62 performs cell selection and before the processing module 62 detects a synchronization signal.

Further, in the embodiment shown in FIG. 6, the sending module 61 is specifically configured to send the first signal before the processing module 62 performs cell selection and before the processing module 62 detects a broadcast signal.

Further, in the embodiment shown in FIG. 6, the sending module 61 is specifically configured to send the first signal before the processing module 62 performs cell selection, after the processing module 62 detects a synchronization signal, and before the processing module 62 detects a broadcast signal.

Further, in the embodiment shown in FIG. 6, the sending module 61 is specifically configured to send the first signal before the processing module 62 performs cell selection, after the processing module 62 detects a synchronization signal, and after the processing module 62 detects a broadcast signal.

Further, in the embodiment shown in FIG. 6, the sending module 61 is specifically configured to send the first signal before the processing module 62 performs cell selection and after the processing module 62 measures a common pilot signal.

Further, in the embodiment shown in FIG. 6, the sending module 61 is specifically configured to send the first signal before the processing module 62 performs cell selection and after the processing module 62 measures a pilot signal.

Figure 7:
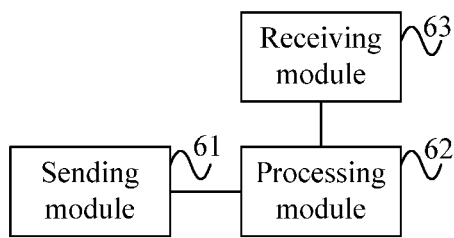
FIG. 7 is a schematic structural diagram of Embodiment 2 of a network device according to an embodiment of the present invention.

FIG. 7 is a schematic structural diagram of Embodiment 2 of a network device according to an embodiment of the present invention. As shown in FIG. 7, based on FIG. 6, the network device in this embodiment further includes: a receiving module 63, configured to: before the sending module 61 sends the second signal after cell selection is performed, receive at least one third signal sent by at least one second network device of the second network device group; and the processing module 62 is specifically configured to perform cell selection according to the at least one third signal.

Further, in the embodiment shown in FIG. 7, the processing module 62 is specifically configured to measure the at least one third signal, and select a cell provided by a second network device corresponding to a third signal with best signal quality.

Further, in the embodiment shown in FIG. 6 or FIG. 7, the first signal and the second signal are orthogonal to each other.

Figure 8:
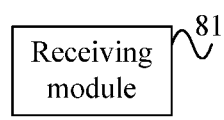
FIG. 8 is a schematic structural diagram of Embodiment 3 of a network device according to an embodiment of the present invention.

FIG. 8 is a schematic structural diagram of Embodiment 3 of a network device according to an embodiment of the present invention. The network device in this embodiment is a second network device. As shown in FIG. 8, the network device in this embodiment includes: a receiving module 81, configured to receive a first signal sent by a first network device before the first network device performs cell selection, and receive a second signal sent by the first network device after the first network device performs cell selection, where resources used by the receiving module 81 to receive the first signal and the second signal are different, and the second signal is a random access signal.

The network device in this embodiment is configured to execute the technical solution in the method embodiment shown in FIG. 4. An implementation principle and a technical effect of the network device in this embodiment are similar to those of the method embodiment shown in FIG. 4, and details are not repeated herein.

Further, in the embodiment shown in FIG. 8, that resources used by the receiving module 81 to receive the first signal and the second signal are different includes: Code word resources used by the receiving module 81 to receive the first signal and the second signal are different, or time resources used by the receiving module 81 to receive the first signal and the second signal are different, or frequency resources used by the receiving module 81 to receive the first signal and the second signal are different, or time-frequency resources used by the receiving module 81 to receive the first signal and the second signal are different.

Figure 9:
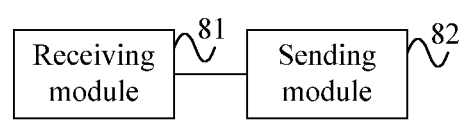
FIG. 9 is a schematic structural diagram of Embodiment 4 of a network device according to an embodiment of the present invention.

FIG. 9 is a schematic structural diagram of Embodiment 4 of a network device according to an embodiment of the present invention. As shown in FIG. 9, based on FIG. 8, the network device in this embodiment further includes: a sending module 82, configured to: before the receiving module 81 receives the first signal sent by the first network device before the first network device performs cell selection, send a multicast signal to the first network device, where the multicast signal includes a first sequence group, the first sequence group is specific to a second network device group to which the second network device belongs, a sequence of the first signal is selected from the first sequence group, and the first sequence group includes at least one sequence.

Figure 10:
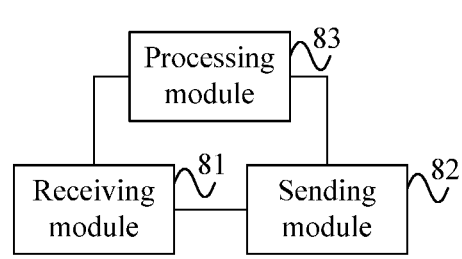
FIG. 10 is a schematic structural diagram of Embodiment 5 of a network device according to an embodiment of the present invention.

FIG. 10 is a schematic structural diagram of Embodiment 5 of a network device according to an embodiment of the present invention. As shown in FIG. 10, based on FIG. 9, the network device in this embodiment further includes: a processing module 83, configured to: before the receiving module 81 receives the second signal sent by the first network device after the first network device performs cell selection, generate a third signal according to the first signal; and the sending module 82 is further configured to send the third signal to the first network device, where the third signal is used to enable the first network device to perform cell selection.

Further, in the embodiment shown in FIG. 10, a time-frequency resource on which the sending module 82 sends the third signal is variable.

Further, in the embodiment shown in FIG. 10, a cycle in which the sending module 82 sends the third signal is variable.

Further, in the embodiment shown in FIG. 9 or FIG. 10, the sending module 82 is further configured to: before the receiving module 81 receives the second signal sent by the first network device after the first network device performs cell selection, send a fourth signal to the first network device, where the fourth signal is a broadcast signal.

Further, in the embodiment shown in FIG. 9 or FIG. 10, a time-frequency resource on which the sending module 82 sends the broadcast signal is variable.

Further, in the embodiment shown in FIG. 9 or FIG. 10, a cycle in which the sending module 82 sends the broadcast signal is variable.

Further, in the embodiments shown in FIG. 8 to FIG. 10, the first signal and the second signal are orthogonal to each other.

It should be noted that, the sending module 61 in the embodiments of the present invention may be corresponding to a transmitter in the network device, or may be corresponding to a transceiver in the network device. The receiving module 63 may be corresponding to a receiver in the network device, or may be corresponding to the transceiver in the network device. The processing module 62 may be corresponding to a processor in the network device. The processor herein may be a central processing unit (CPU), or an application-specific integrated circuit (ASIC), or one or more integrated circuits implementing the embodiments of the present invention. The network device may further include a memory. The memory is configured to store instruction code. The processor invokes the instruction code from the memory, to control the sending module 61 and the receiving module 63 in the embodiments of the present invention to perform the foregoing operations.

The receiving module 81 in the embodiments of the present invention may be corresponding to a transmitter in the network device, or may be corresponding to a transceiver in the network device. The sending module 82 may be corresponding to a receiver in the network device, or may be corresponding to the transceiver in the network device. The processing module 83 may be corresponding to a processor in the network device. The processor herein may be a CPU, or an ASIC, or one or more integrated circuits implementing the embodiments of the present invention. The network device may further include a memory. The memory is configured to store instruction code. The processor invokes the instruction code from the memory, to control the receiving module 81 and the sending module 82 in the embodiments of the present invention to perform the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present invention shall be subject to the protection scope of the claims.

What is claimed is:

1. A network device, wherein the network device is a first network device, and the network device comprises:
   a transmitter;
   a processor; and
   a computer-readable storage medium storing a program to be executed by the processor, the program including instructions for:
   select a first sequence from among a plurality of sequences comprised in a first sequence group, wherein the first sequence group is specific to a second network device group to which a second network device belongs, the second network device provides a cell to be selected by the first network device, and the plurality of sequences comprised in the first sequence group is known to the first network device before the first sequence is determined;

after determining the first sequence, and before detecting a synchronization signal, repeatedly sending, using the transmitter, a first signal in a first time period according to the determined first sequence, wherein the first signal is repeatedly sent using each of a plurality of frequencies of a fixed frequency set; and after repeatedly sending the first signal in the first time period, performing cell selection;

wherein the transmitter is configured to send a second signal after the network device performs the cell selection, wherein resources used to repeatedly send the first signal and resources used to send the second signal are different, and the second signal is a random access signal.

2. The network device according to claim 1, wherein the first sequence group is determined using multicast signals, the multicast signals are sent by a plurality of second network devices of the second network device group at the same time, and the first sequence group is determined before the first sequence is determined.

3. The network device according to claim 1, wherein the transmitter is configured to:

determine the first sequence in the first sequence group, wherein the first sequence group is pre-defined and stored on the first network device.

4. The network device according to claim 1, wherein the transmitter is configured to repeatedly send the first signal in the first time period before the cell selection is performed; and wherein the transmitter is further configured to stop sending the first signal in a second time period, wherein the first time period and the second time period are pre-defined.

5. A network device, wherein the network device is a second network device, and the network device comprises:

a processor;

a transmitter, configured to send a fifth signal to a first network device, wherein the fifth signal comprises a first sequence group comprising a plurality of sequences, the plurality of sequences of the first sequence group is specific to a second network device group to which the second network device belongs, the plurality of sequences comprises a first sequence, and the fifth signal is a multicast signal that is simultaneously and respectively sent by a plurality of network devices including the second network device;

a receiver, configured to:

after the fifth signal is sent by the transmitter, receive a first signal sent by a first network device before the first network device performs cell selection, wherein a sequence of the first signal is the first sequence; and a non-transitory computer-readable storage medium storing a program to be executed by the processor, the program including instructions for:

generating a third signal according to the first signal, wherein the third signal enables the first network device to perform cell selection;

determining, according to the first signal and information of the first network device that is obtained by the second network device according to the first signal, a time-frequency resource in which the first network device is able to receive the third signal; and sending, using the transmitter, the third signal to the first network device using the determined time-frequency resource in which the first network device is able to receive the third signal; and wherein the receiver is further configured to:

receive a second signal sent by the first network device after the first network device performs cell selection, wherein resources used by the receiver to receive the first signal and the second signal are different, and the second signal is a random access signal.

6. The network device according to claim 5, wherein the used resources being different comprises:

used code word resources being different;

used time resources being different;

used frequency resources being different; or used time-frequency resources being different.

7. The network device according to claim 5, wherein the transmitter is further configured to:

before the receiver receives the second signal sent by the first network device after the first network device performs cell selection, send a fourth signal to the first network device, wherein the fourth signal is a broadcast signal.

8. The network device according to claim 7, wherein a time-frequency resource on which the transmitter sends the broadcast signal is variable.

9. The network device according to claim 7, wherein a cycle in which the transmitter sends the broadcast signal is variable.

10. The network device according to claim 5, wherein the first signal and the second signal are orthogonal to each other.

* * * * *